United States Patent
Hoshuyama et al.

(10) Patent No.: US 10,967,909 B2
(45) Date of Patent: Apr. 6, 2021

(54) SIDE VEHICLE-BODY STRUCTURE OF VEHICLE

(71) Applicant: MAZDA MOTOR CORPORATION, Hiroshima (JP)

(72) Inventors: Hideaki Hoshuyama, Hiroshima (JP); Shuang Gao, Hiroshima (JP); Ryota Nakayama, Itsukaichi (JP); Akihiro Kawano, Hiroshima (JP); Satoshi Okumura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 4 days.

(21) Appl. No.: 16/516,201

(22) Filed: Jul. 18, 2019

(65) Prior Publication Data
US 2020/0102016 A1  Apr. 2, 2020

(30) Foreign Application Priority Data

Sep. 27, 2018  (JP) .............................. JP2018-182058

(51) Int. Cl.
| | |
|---|---|
| *B62D 21/15* | (2006.01) |
| *B62D 25/04* | (2006.01) |
| *B60J 5/04* | (2006.01) |
| *B60R 22/34* | (2006.01) |

(52) U.S. Cl.
CPC ........... *B62D 21/157* (2013.01); *B62D 25/04* (2013.01); *B60J 5/0443* (2013.01); *B60R 22/34* (2013.01)

(58) Field of Classification Search
CPC .............................. B62D 21/157; B62D 25/04
USPC ....................................... 296/187.12, 193.06
See application file for complete search history.

(56) References Cited

U.S. PATENT DOCUMENTS

| | | | | |
|---|---|---|---|---|
| 8,246,108 B2 * | 8/2012 | Itakura | .................... | B62D 25/04 296/193.06 |
| 8,967,703 B2 * | 3/2015 | Wawers | ............... | B62D 21/157 296/193.06 |
| 2011/0095567 A1 | 4/2011 | Ishigame et al. | | |
| 2011/0133515 A1 * | 6/2011 | Mori | .................... | B62D 21/157 296/193.06 |
| 2016/0355214 A1 * | 12/2016 | Irie | ....................... | B62D 21/157 |

FOREIGN PATENT DOCUMENTS

JP  2011-088596 A  5/2011

* cited by examiner

*Primary Examiner* — Joseph D. Pape
(74) *Attorney, Agent, or Firm* — Studebaker & Brackett PC

(57) ABSTRACT

A side frame comprises a center pillar which includes a reinforcement provided on an outward side in a vehicle width direction and an inner panel provided on an inward side in the vehicle width direction. The reinforcement comprises upper-and-lower hinge attachment sections for attaching rear-door hinges and first-and-second recessed beads for promoting bending of the center pillar in a vehicle side collision. The hinge attachment sections are provided to be spaced apart from each other in a vertical direction. The first recessed bead is provided at a higher level than the lower hinge attachment section. The second recessed bead is provided at a lower level than the lower hinge attachment section and configured to be bent before the first recessed bead in the vehicle side collision.

8 Claims, 13 Drawing Sheets

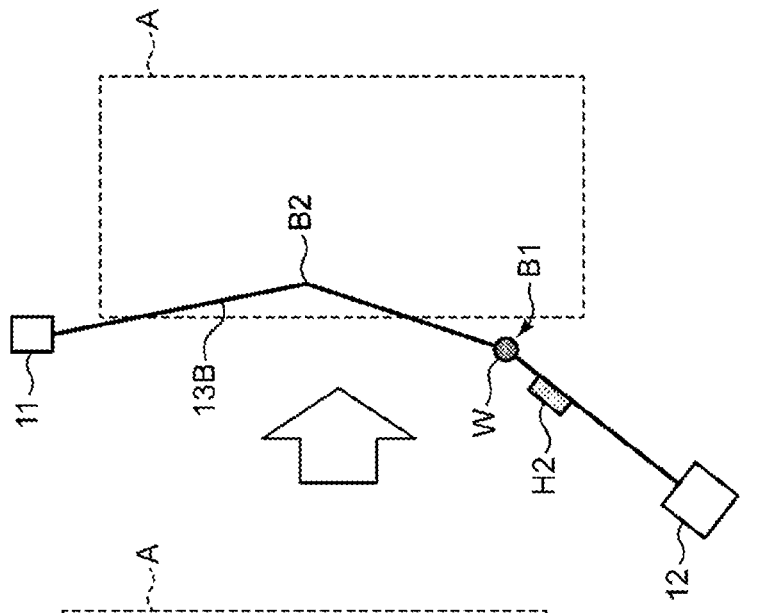
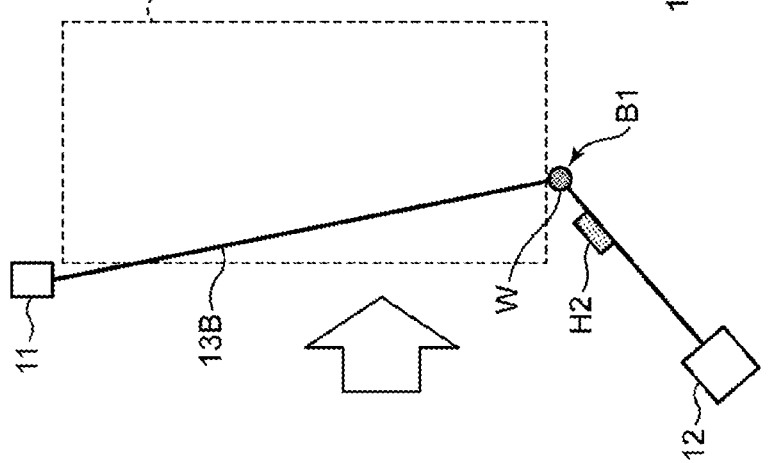
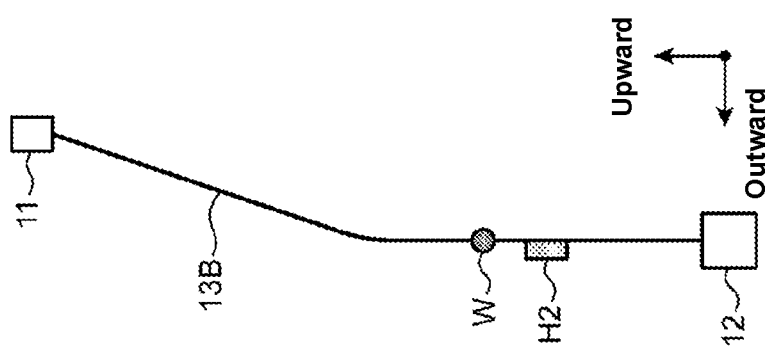

SIDE VEHICLE-BODY STRUCTURE OF VEHICLE

BACKGROUND OF THE INVENTION

The present invention relates to a side vehicle-body structure of a vehicle which comprises a center pillar including a reinforcement provided on an outward side, in a vehicle width direction, of a vehicle body and an inner panel provided on an inward side, in the vehicle width direction, of the vehicle body.

There is a case where when a side-collision load is applied to a vehicle, such as an automotive vehicle, a central part, in a vertical direction, of a center pillar is bent the most, so that the center pillar is greatly deformed into a cabin. Herein, it is required that this bending deformation of the center pillar into the cabin is suppressed in order to protect an occupant of the vehicle. However, there is a limit in improving the rigidity of the center pillar. Herein, Japanese Patent Laid-Open Publication No. 2011-88596 (its counterpart US Patent Application Publication No. 2011/0095567 A1) discloses a technology that a fragile section is intentionally formed at the reinforcement of the center pillar, wherein the fragile section has the lower (weaker) rigidity than the other section. In the technology disclosed in the above-described patent document, the fragile section which is a recessed groove is formed at around a position which is located at a higher level than a lower hinge attachment section provided at the center pillar.

The above-described hinge attachment section of the center pillar becomes an input point of the side-collision load to the reinforcement in a vehicle side collision. Therefore, when the load is inputted to the lower hinge attachment section of the center pillar in the vehicle side collision, the above-described fragile section becomes a bending causing point. That is, it is intended that an upper part of the center pillar is suppressed from being bent (deformed) greatly into the cabin by positively bending around a lower part of the center pillar in the vehicle side collision.

Herein, the vehicle has been required to improve the rigidity of the center pillar. However, if this rigidity improvement of the center pillar has been progressed, there is a concern that even if the above-described fragile section, such as the recessed groove, is formed at the reinforcement, this fragile section may not become the bending causing point in the vehicle side collision. In this case, there occurs a problem that a portion of the center pillar around the central part, in a vertical direction, of the center pillar becomes the bending causing point, so that the occupant protection may not be attained properly.

SUMMARY OF THE INVENTION

An object of the present invention is to provide a side vehicle-body structure of a vehicle which can properly bend the center pillar at a targeted position in the vehicle side collision.

The present invention is a side vehicle-body structure of a vehicle, comprising a center pillar including a reinforcement provided on an outward side, in a vehicle width direction, of a vehicle body and an inner panel provided on an inward side, in the vehicle width direction, of the vehicle body, wherein the reinforcement of the center pillar comprises upper-and-lower hinge attachment sections for attaching hinges of a rear door and first-and-second fragile sections for promoting bending of the center pillar in a vehicle side collision, the upper-and-lower hinge attachment sections are provided to be spaced apart from each other in a vertical direction, the first fragile section is provided at a higher level than the lower hinge attachment section, and the second fragile section is provided at a lower level than the lower hinge attachment section and configured to be bent before the first fragile section in the vehicle side collision.

According to the side vehicle-body structure of the present invention, the first-and-second fragile sections are respectively provided at the higher level and the lower level than the lower hinge attachment section of the reinforcement which becomes the input point of the side-collision load. Accordingly, the fragility of a portion around the lower hinge attachment section can be properly enhanced, compared to the upper part of the reinforcement which faces a cabin space for an occupant (passenger), so that this portion can be securely the bending causing point in the vehicle side collision. Further, since the center pillar is bent at two different points of the first-and-second fragile sections, the sufficient amount of bending can be obtained when receiving the side-collision load, so that bending of the other section of the reinforcement can be properly prevented. Moreover, the second fragile section located at the lower level than the lower hinge attachment section is bent in advance and then the first fragile section located at the upper level than the lower hinge attachment section comes to be bent. Accordingly, the bending causing point is positioned at a properly lower level, compared to the conventional structure disclosed in the above-described patent document, for example, so that the possibility of interference of the center pillar with the occupant can be properly reduced.

In an embodiment of the present invention, a distance between the second fragile section and the lower hinge attachment section is set to be shorter than that between the first fragile section and the lower hinge attachment section.

According to the side vehicle-body structure of this embodiment, the second fragile section is positioned more closely to the lower hinge attachment section which becomes the input point of the side-collision load, compared to the first fragile section is. Accordingly, the structure in which the second fragile section is bent before the bending of the first fragile section in the vehicle side collision can be formed easily and securely.

In another embodiment of the present invention, the first-and-second fragile sections are first-and-second recessed beads which respectively extend in a horizontal direction from a one-end side, in a vehicle longitudinal direction, of the reinforcement to the other-end side.

According to the side vehicle-body structure of this embodiment, the first-and-second recessed beads become bending lines of the reinforcement which is bent in the vehicle width direction. Accordingly, the reinforcement can be bent at a targeted position and in a targeted direction in the vehicle side collision by forming the first-and-second recessed beads at respective desired positions.

In another embodiment of the present invention, the inner panel of the center pillar includes a low-strength section at an area facing the second fragile section.

According to the side vehicle-body structure of this embodiment, the fragility of a portion of the center pillar around the second fragile section can be further enhanced by providing the low-strength section at the inner panel as well. Accordingly, the bending of the second fragile section in advance to the first fragile section in the vehicle side collision can be more promoted.

In another embodiment of the present invention, the side vehicle-body structure further comprises a seatbelt retractor which is provided inside the center pillar at a lower level than the lower hinge attachment section, wherein the inner panel of the center pillar includes an opening portion for assembling the seatbelt retractor at an area facing the second recessed bead.

According to the side vehicle-body structure of this embodiment, the seatbelt retractor can be assembled into the center pillar, and also the fragility of the center pillar around the second recessed bead can be further enhanced by means of the opening portion of the inner panel which is provided for assembling the seatbelt retractor.

In this case, it is preferable that a bead depth of the second recessed bead be set such that respective bead depths of a one-end side, in the vehicle longitudinal direction, of the second recessed bead and the other-end side, in the vehicle longitudinal direction, of the second recessed bead are deeper than the bead depth of a central part, in the vehicle longitudinal direction, of the second recessed bead.

According to the side vehicle-body structure of this case, since the bead depth of the above-described central part is shallow compared to the bead depth of the above-described one-end side or the above-described other-end side, a storage space for the seatbelt retractor can be easily formed inside the center pillar, thereby improving the storability of the seatbelt retractor. Further, since the bead depth of the second recessed bead is set such that the above-described one-end side or the above-described other-end side is relatively deep, the bending properties of these sides can be made appropriate. Accordingly, the reinforcement can be easily bent along the second recessed bead as intended.

In another embodiment of the present invention, the central part, in the vehicle longitudinal direction, of the second recessed bead is configured to be curved upwardly compared to the above-described one-end side and the above-described other-end side of the second recessed bead.

According to the side vehicle-body structure of this embodiment, an arrangement space of the seatbelt retractor can be secured more properly by the upwardly-curved configuration of the above-described central part.

In another embodiment of the present invention, the side vehicle-body structure further comprises a reinforcing plate which is provided at an outside face of the reinforcement at a position located at a higher level than the first fragile section.

According to the side vehicle-body structure of this embodiment, the rigidity of a portion of the reinforcement which is located at the higher level than the first fragile section is increased by the reinforcing plate. Therefore, the rigidity difference between portions where the first-and-section fragile sections are formed and a portion where the reinforcing plate is provided can be made properly large. Accordingly, an ideal state of the center pillar in the vehicle side collision where its lower part provided with the first-and-second fragile sections is bent but its upper part maintains the linearity can be easily created.

Other features, aspects, and advantages of the present invention will become apparent from the following description which refers to the accompanying drawings.

BRIEF DESCRIPTION OF THE DRAWINGS

FIGS. 12A-12C are schematic diagrams showing moves of a center pillar in the vehicle side collision according to a second comparative example.

DETAILED DESCRIPTION OF THE INVENTION

[Comprehensive Description of Vehicle Body]

Figure 1:
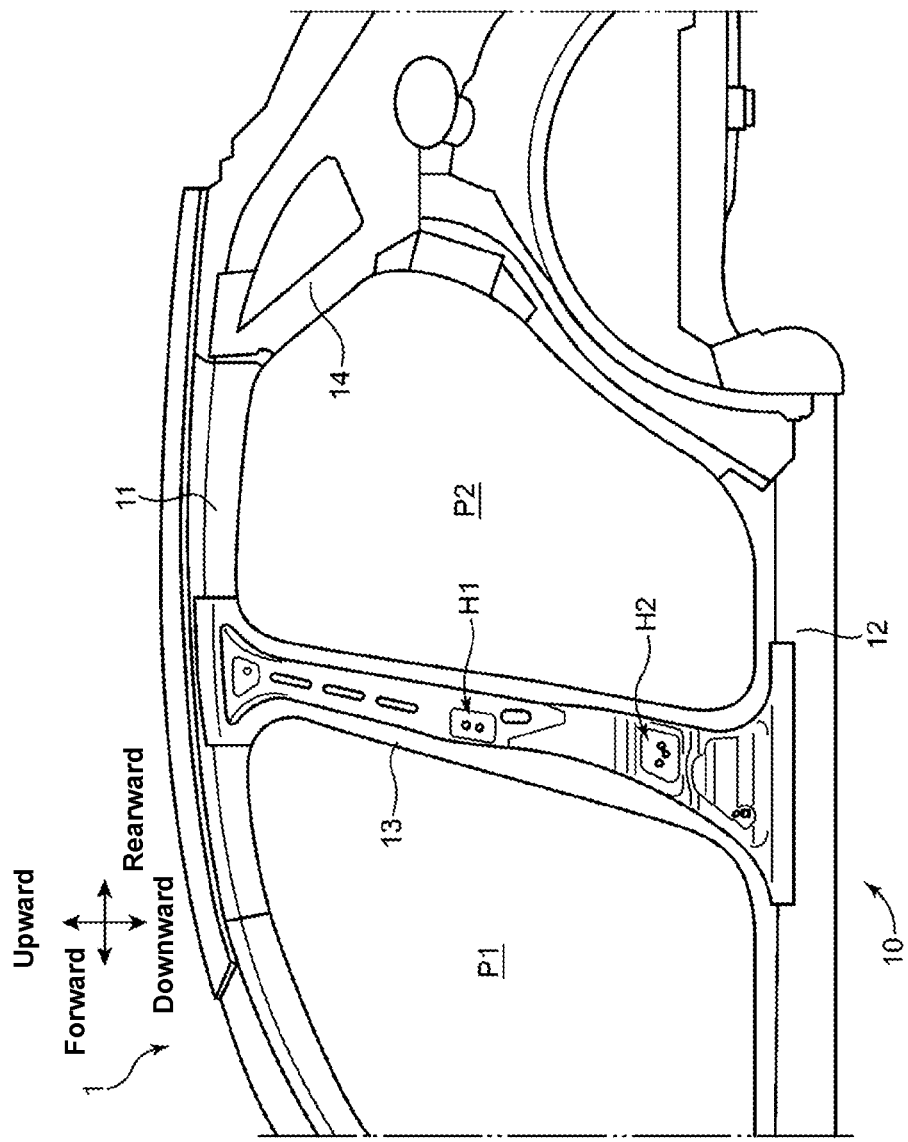
FIG. 1 is a side view showing a part of a vehicle body of a vehicle to which a side vehicle-body structure of the present invention is applied.

Hereafter, an embodiment of the present invention will be described specifically referring to the drawings. FIG. 1 is a side view showing a part of a vehicle body 1 of a vehicle to which a side vehicle-body structure of the present invention is applied. The present embodiment shows a four-door sedan type of automotive vehicle as the vehicle. FIG. 1 and others include respective arrows with the terms of "forward," "rearward," "upward," and "downward", which respectively show a forward side, a rearward side, an upward side, and a downward side of the vehicle, and also arrows with the terms of "outward" and "inward", which respectively show an outward side and an inward side in a vehicle width direction.

The vehicle body 1 comprises a side frame 10 (side vehicle-body structures) which constitutes each of both side faces, in the vehicle width direction, of the vehicle. In FIG. 1, the side frame 10 which constitutes one of the both side faces of the vehicle is illustrated. The side frame 10 comprises a roof rail 11, a side sill 12, a center pillar 13, a rear pillar 14, and a front pillar (not illustrated).

The roof rail 11 extends in a vehicle longitudinal direction at an upper portion of the vehicle, and the side sill 12 extends in the vehicle longitudinal direction at a lower portion of the vehicle. The roof rail 11 and the side sill 12 are interconnected in a vertical direction, respectively, by the front pillar at a front side, by a rear pillar 14 at a rear side, and by a center pillar 13 at a central side. In the side frame 10, an opening positioned in front of the center pillar 13 is a front occupant's ingress/egress opening P1 and another opening positioned in back of the center pillar 13 is a rear occupant's ingress/egress opening P2.

A front door (not illustrated) is attached to the front pillar so as to open or close the front occupant's ingress/egress opening P1 and a rear door (not illustrated) is attached to the center pillar 13 so as to open or close the rear occupant's ingress/egress opening P2. Upper-and-lower hinge attachment sections H1, H2 for attaching hinges of the rear door are provided at the center pillar 13 such that these sections H1, H2 are spaced apart from each other in the vertical direction. The present embodiment shows an example in which the upper hinge attachment section H1 is arranged at around a central position, in the vertical direction, of the center pillar 13, and the lower hinge attachment section H2 is arranged at around a lower end position of the center pillar 13 which is positioned closely to its connection portion to the side sill 12.

Figure 2:
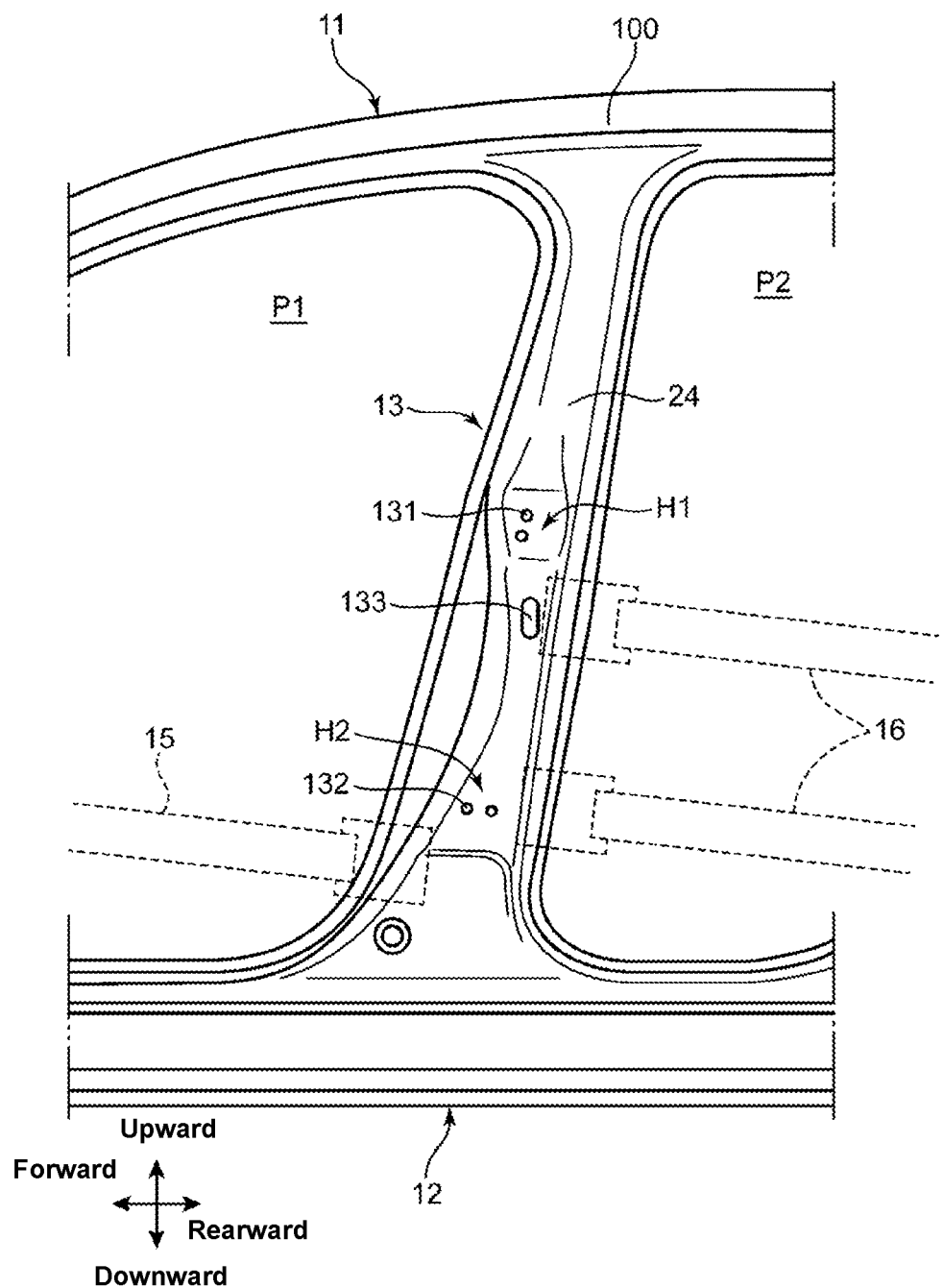
FIG. 2 is a side view showing an outer appearance of a part of a side frame.

FIG. 2 is a side view showing an outer appearance of the center pillar 13 of the side frame 10. A side frame outer 100 which becomes an exterior side face of the vehicle body 1 is attached to an outside face of the side frame 10. On an inward side of this side frame outer 100 are arranged the roof rail 11, the side sill 12, the center pillar 13 and others. For example, an outermost portion of the center pillar 13 is formed by an outer panel 24 which is a center-pillar portion of the side frame outer 100.

In FIG. 2, a front-door impact bar 15 which is arranged inside the front door and a pair of upper-and-lower rear-door impact bars 16 which are arranged inside the rear door are illustrated by dotted lines, respectively. These impact bars 15, 16 are reinforcing members to improve resistance against crushing of the front door and the rear door in the vehicle side collision, which are provided to extend in the longitudinal direction inside the doors. The upper rear-door impact bar 16 extends such that its front end is positioned closely to the upper hinge attachment section H1, and the lower rear-door impact bar 16 extends such that its front end is positioned closely to the lower hinge-attachment section H2. In a case where the vehicle has a side collision at the rear door, its side-collision load is transmitted from the pair of upper-and-lower rear-door impact bars 16 to the center pillar 13 through the upper hinge attachment section H1 and the lower hinge attachment section H2.

[Details of Center Pillar]

Figure 3:
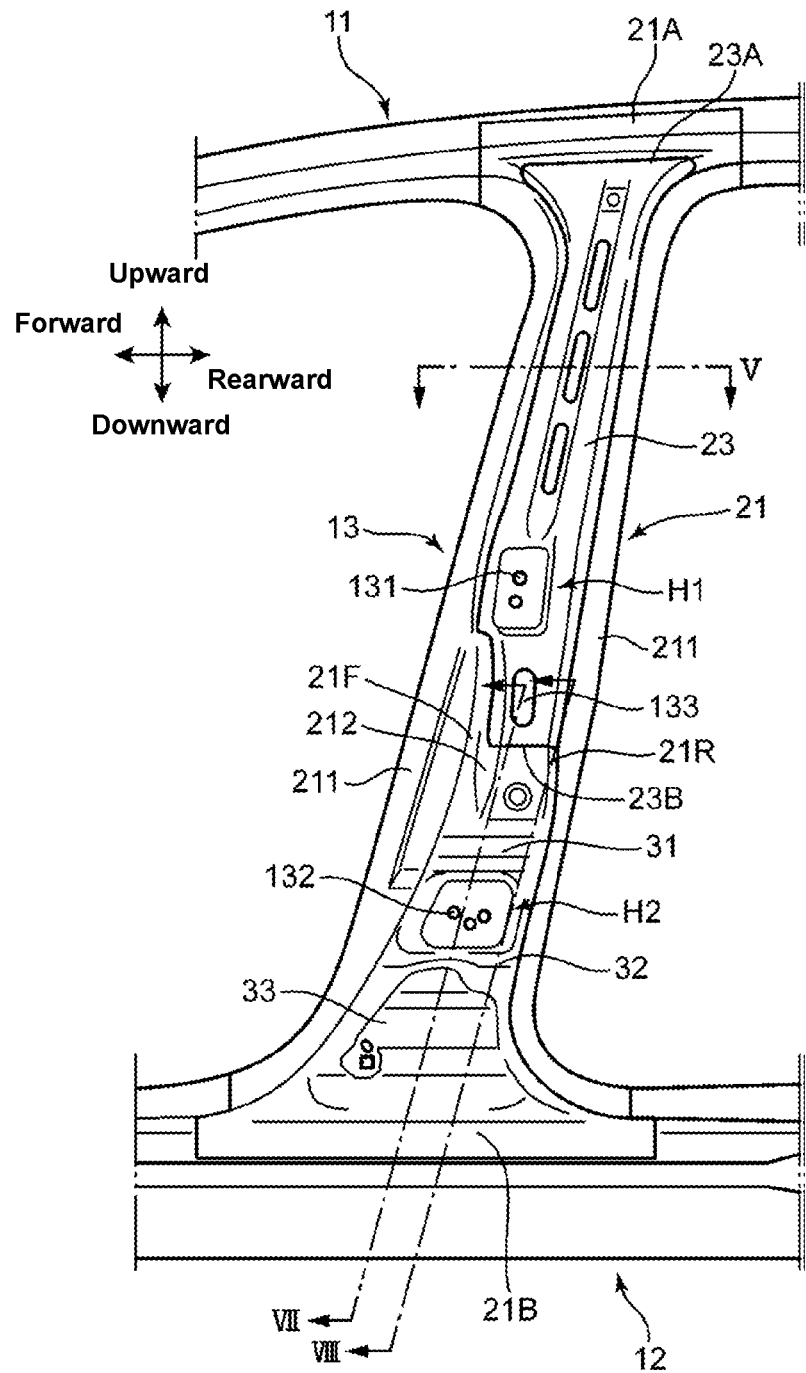
FIG. 3 is a side view of an outward side, in a vehicle width direction, of a center pillar, in which an outer panel is removed.
Figure 4:
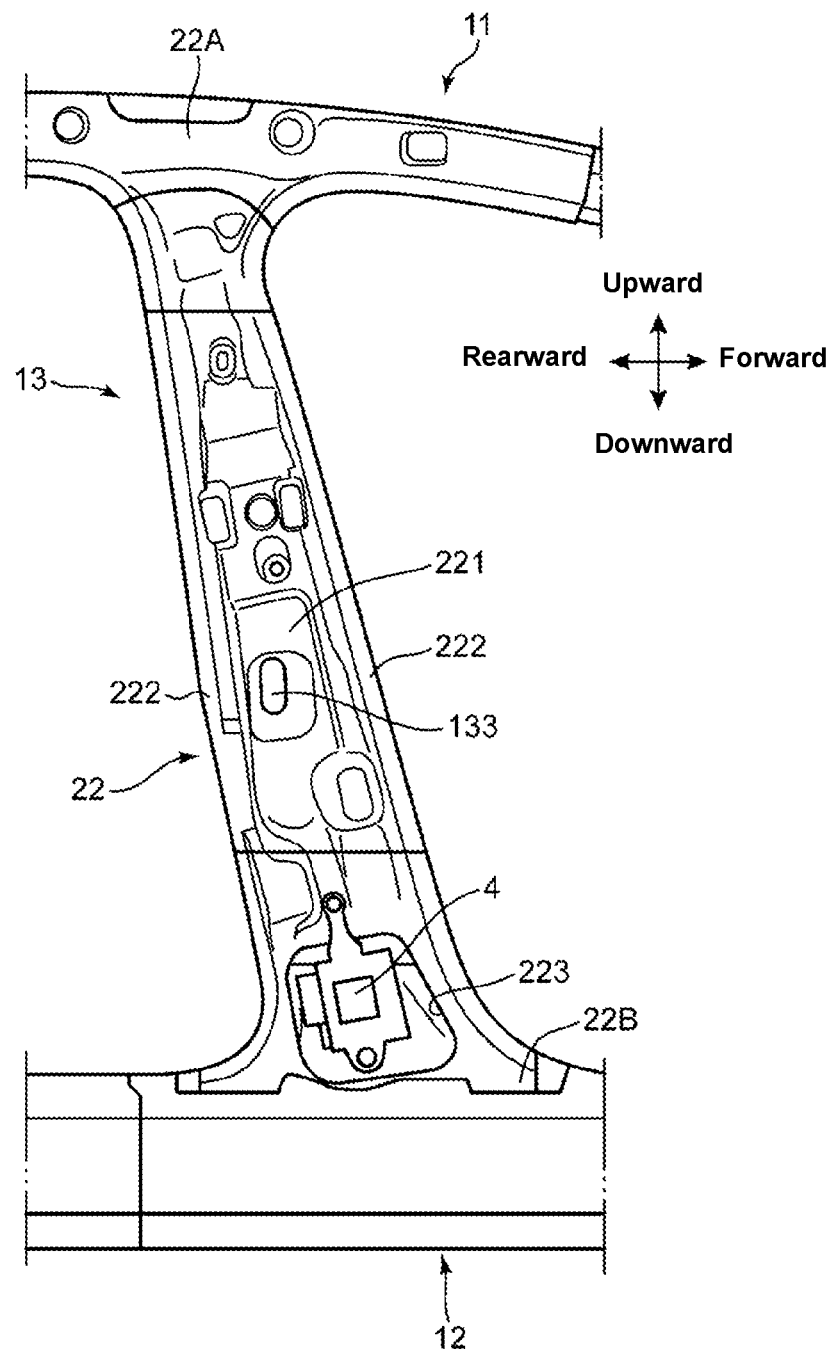
FIG. 4 is a side view of an inward side, in the vehicle width direction, of the center pillar.
Figure 5:
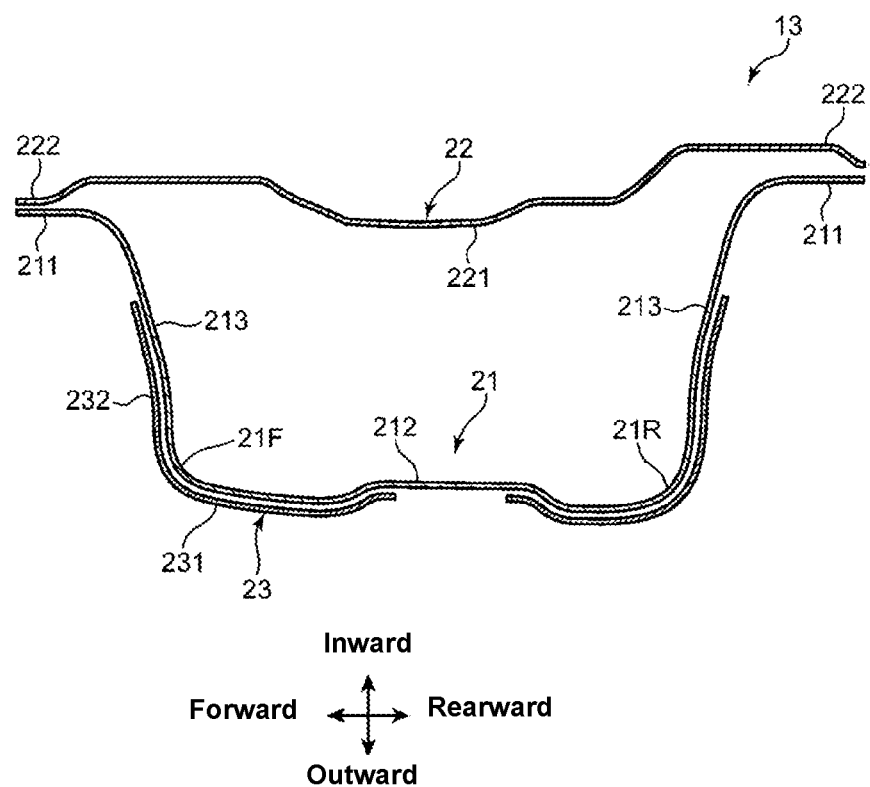
FIG. 5 is a sectional view taken along line V-V of FIG. 3.

FIG. 3 is a side view of the outward side, in the vehicle width direction, of the center pillar 13, in which the outer panel 24 is removed, FIG. 4 is a side view of the inward side, in the vehicle width direction, of the center pillar 13, and FIG. 5 is a sectional view taken along line V-V of FIG. 3. The center pillar 13 comprises a reinforcement 21 which is positioned on the outward side, in the vehicle width direction, of the vehicle body 1, an inner panel 22 which is positioned on the inward side, in the vehicle width direction, of the vehicle body 1, a patch 23 (reinforcing plate) which is provided at an outside face of the reinforcement 21, and the above-described outer panel 24.

The reinforcement 21 serves as a member to provide the rigidity of the center pillar 13 which is made of a high-strength material. The reinforcement 21 is manufactured by hot press processing in which a heated steel is pressed with a dice, for example. In this case, the natural cooling method in which the dice is naturally cooled after the press forming or the forced cooling method in which the dice is forcibly cooled with the water may be applied. The latter method is preferable in properly increasing the strength of the formed steel plate, thereby attaining improvement of the rigidity and weight reduction of the reinforcement 21.

Referring to FIG. 3, the reinforcement 21 is configured to have a hat-shaped cross section extending slightly obliquely in the vertical direction and include joint faces having longitudinally-enlarged width at its upper end portion 21A and its lower end portion 21B. The joint face of the upper end portion 21A is joined to an outer face of an outer member of the roof rail 11 by spot welding or the like. The joint face of the lower end portion 21B is joined to an outer face of a side sill outer 122 (see FIG. 7) of the side sill 12. The longitudinal width of the reinforcement 21 is configured to become gradually narrow as it goes upwardly.

Referring to FIG. 5 as well, the rigidity of the reinforcement 21 is increased by not only its material but its shape having the hat-shaped cross section. The reinforcement 21 comprises a pair of front-and-rear flange portions 211, a protrusion portion 212, and a pair of front-and-rear rising portions 213.

The pair of flange portions 211 are band-shaped flat faces extending in the vertical direction at a front-end side and a rear-end side of the reinforcement 21, which constitute its joint faces to the inner panel 22. The protrusion portion 212 is a top portion of the above-described hat-shape cross section, which constitutes a flat plate protruding outwardly in the vehicle width direction. The front rising portion 213 is configured to connect a front end of the protrusion portion 212 and the front flange portion 211, and the rear rising portion 213 is configured to connect a rear end of the protrusion portion 212 and the rear flange portion 211. The rising portions 123 connects to front-and-rear ends of the protrusion portion 212 with a curved shape having nearly a right angle, respectively, and a front ridgeline portion 21F (one-end side in the vehicle longitudinal direction) is formed at its front connection portion and a rear ridgeline portion 21R (the other-end side in the vehicle longitudinal direction) is formed at its rear connection portion.

The reinforcement 21 is provided with the above-described upper hinge attachment section H1 and the above-described lower hinge attachment section H2 which are provided to be spaced apart from each other in the vertical direction. Screw holes 131 to attach the rear door to an upper rear-door hinge are formed at the upper hinge attachment section H1, and screw holes 132 to attach the rear door to a lower rear-door hinge 5 (see FIG. 6) are formed at the lower hinge attachment section H2. Further, a harness hole 133 where electricity-supply harnesses for electric devices installed inside the rear door penetrate is formed between the upper hinge attachment section H1 and the lower hinge attachment section H2.

The reinforcement 21 comprises a first recessed bead 31 (first fragile section) and a second recessed bead 32 (second fragile section) which are provided for promoting bending of the center pillar 13 in the vehicle side collision. The first recessed bead 31 is provided at a higher level than the lower hinge attachment section H2 and the second recessed bead 32 is provided at a lower level than the lower hinge attachment section H2 such that these beads 31, 32 are arranged adjacently to each other. These beads 31, 32 are sections which are intentionally formed at the reinforcement 21, respectively, as a fragile portion (where the rigidity is low (weak)) which can become a causing point of bending of the center pillar (i.e., the bending causing point of the center pillar 13) in the vehicle side collision. The present embodiment is configured such that the second recessed bead 32 is more fragile than the first recessed bead 31, that is, the second recessed bead 32 is bent before the first recessed bead 31 in the vehicle side collision. These fragile sections will be specifically described later.

A housing section 33 which protrudes outwardly is formed at the reinforcement 21 at a position between the second recessed bead 32 and the lower end portion 21B. This housing section 33 is a portion which is used as a storage space of a seatbelt retractor 4 which will be described.

Referring to FIGS. 4 and 5, the inner panel 22 is a schematically flat-face shaped member and forms a closed cross section C (FIGS. 7 and 8) together with the reinforcement 21 having the hat-shaped cross section. An upper end portion 22A of the inner panel 22 is joined to an outer face of an inner member of the roof rail 11 by spot welding or the like. A lower end portion 22B of the inner panel 22 is fixed to the side sill 12 in such a manner that it comes into the closed cross section of the side sill 12.

The inner panel 22 comprises a flat plate portion 221 and a pair of joint portions 222 which are provided at front-and-rear end portions of the flat plate portion 221. The flat plate portion 221 faces, in the vehicle width direction, the protrusion portion 212 of the reinforcement 21 via a closed-cross section space. The pair of joint portions 222 are joined to the pair of flange portions 211 of the reinforcement 21, respectively. An opening portion 223 (low strength portion) is provided at a slightly higher level than the lower end portion 22B of the flat plate portion 221. This opening portion 223 opens at an area which faces the second recessed bead 32 of the reinforcement 21.

The above-described opening portion 223 is an opening for assembling the seatbelt retractor 4 which winds up/delivers out a seatbelt as well. The seatbelt retractor 4 is installed at a position which is located at a lower level than the lower hinge attachment section H2 and near the lower end of the center pillar 13 such that a nearly half part of the seatbelt retractor 4 protrudes inwardly, in the vehicle width direction, from the opening portion 223 (see FIG. 7) and the rest of that is stored inside the housing section 33.

Referring to FIGS. 3 and 5, the patch 23 is a reinforcing plate which is provided at the outside face of the reinforcement 21 so as to cover over a nearly upper half of the reinforcement 21. The patch 23 comprises an outer plate 231 which is overlapped with the protrusion portion 212 of the reinforcement 21 and a slant plate 232 which is overlapped with the rising portion 213 of the reinforcement 21. The patch 23 is formed integrally with the reinforcement 21 by the spot welding or the like.

An upper end portion 23A of the patch 23 extends around up to its connection portion to the roof rail 11. A lower end portion 23B of the patch 23 extends up to a position which is located at a middle position between the upper hinge attachment section H1 and the lower hinge attachment section H2 and at a higher level than the first recessed bead 31. The rigidity of inward-directional bending, in the inward direction, of the upper half of the reinforcement 21 is increased by the patch 23 described above. That is, a rigidity difference of the section (high rigidity portion) of the reinforcement 21 where the patch 31 is provided relative to the sections of the reinforcement 21 where the first-and-second recessed beads 31, 32 as the fragile sections are provided is increased. Further, the patch 23 covers over the upper hinge attachment section H1. Accordingly, the side-collision load inputted from the upper rear-door impact bar 16 to the upper hinge attachment section H1 is received by the layered structure of the reinforcement 21 and the patch 23. Therefore, the resistance of the upper half of the center pillar 13 is so increased that the center pillar 13 can be restrained from being deformed into the cabin in the vehicle side collision.

[Details of Fragile Section]

Figure 6:
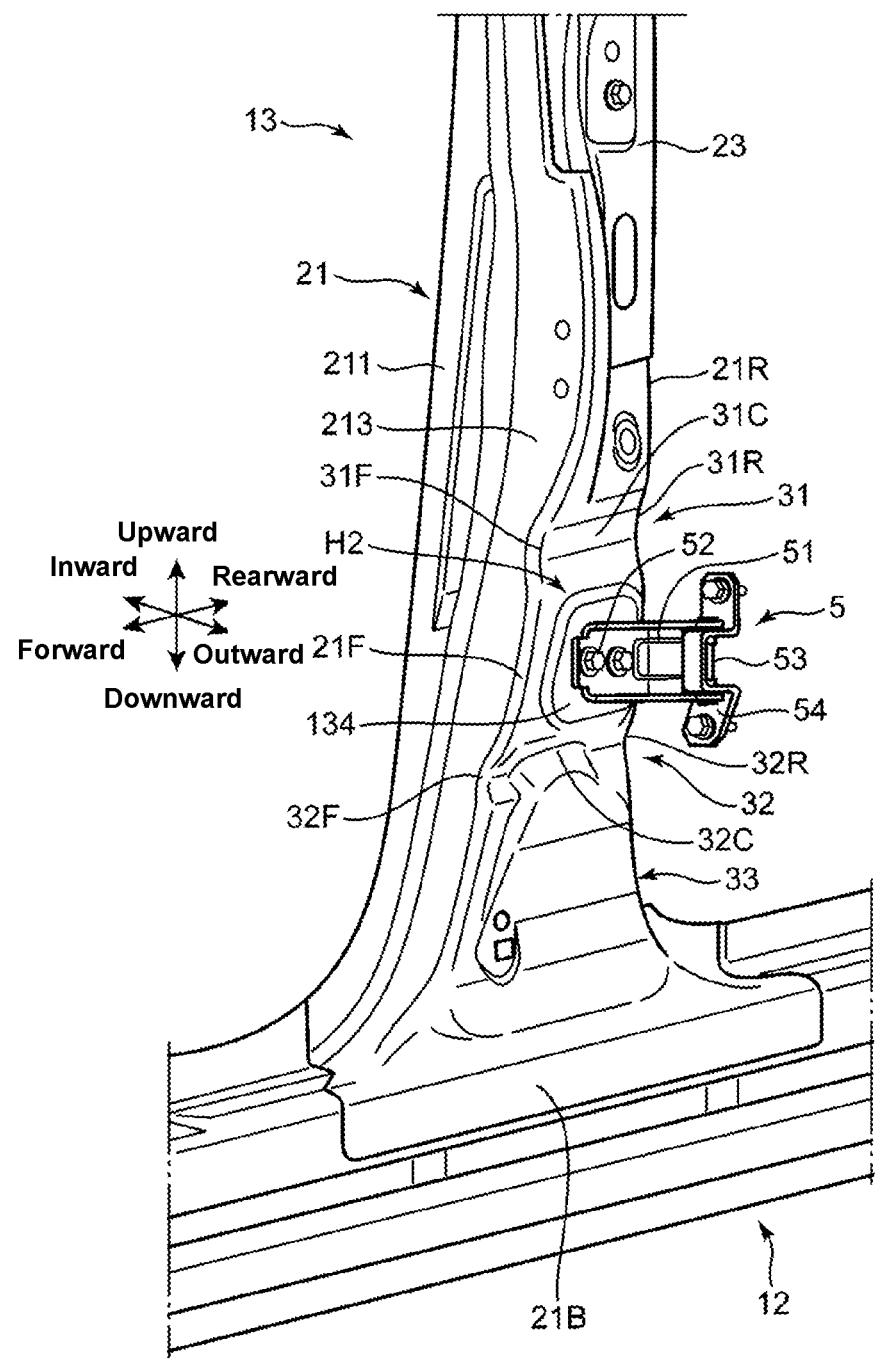
FIG. 6 is a perspective view of the outward side, in the vehicle width direction, of the center pillar.
Figure 7:
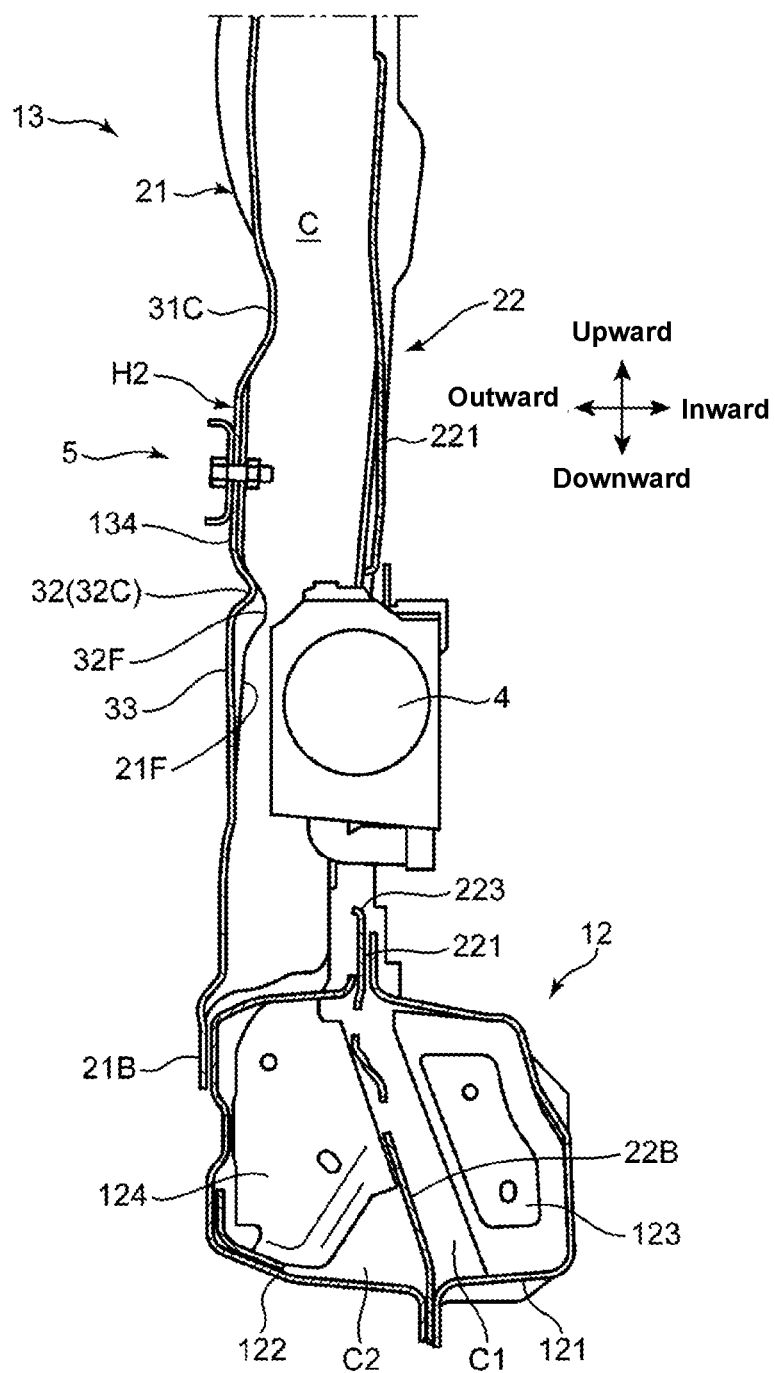
FIG. 7 is a sectional view taken along line VII-VII of FIG. 3.
Figure 8:
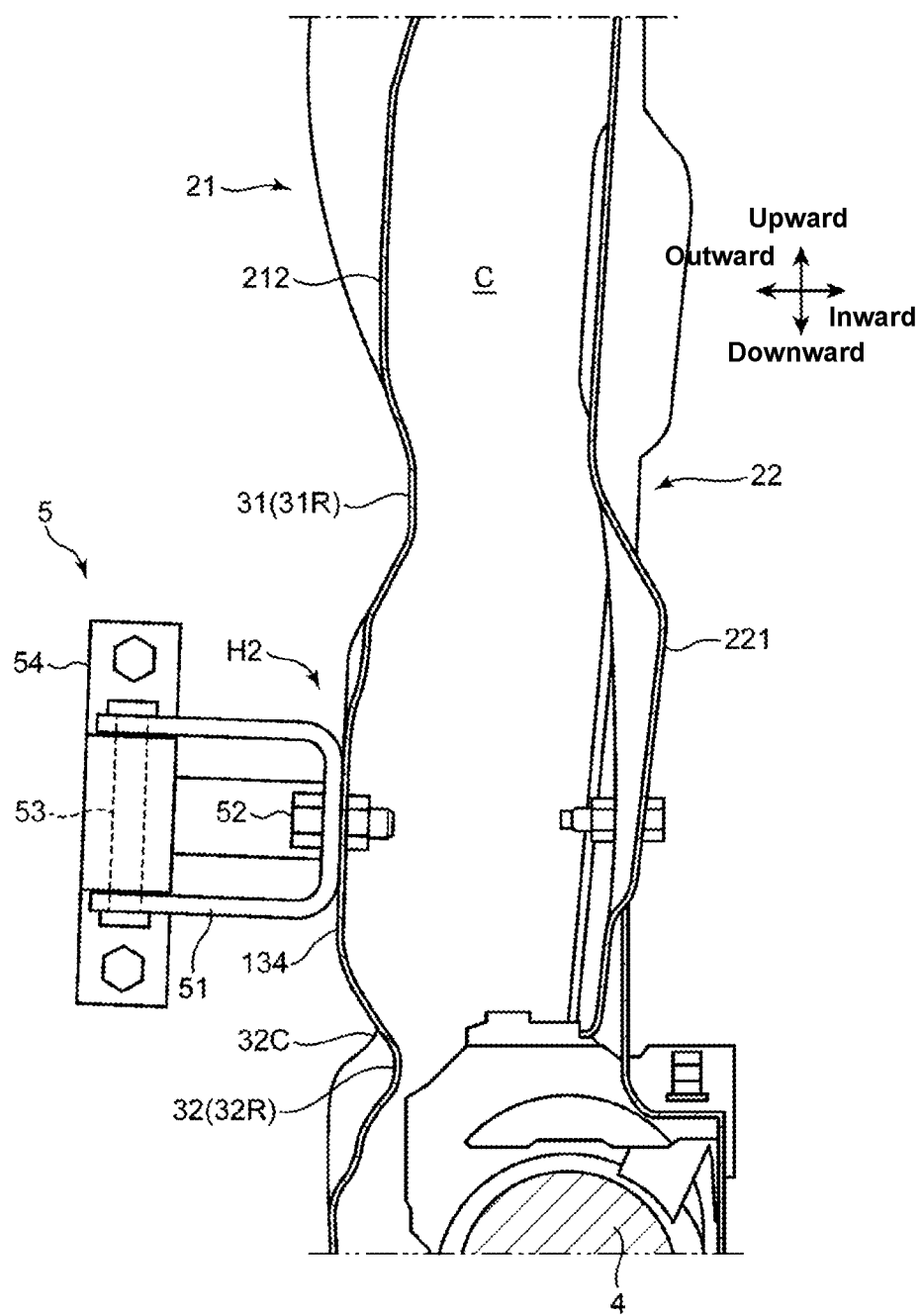
FIG. 8 is a sectional view taken along line VIII-VIII of FIG. 3.
Figure 9A:
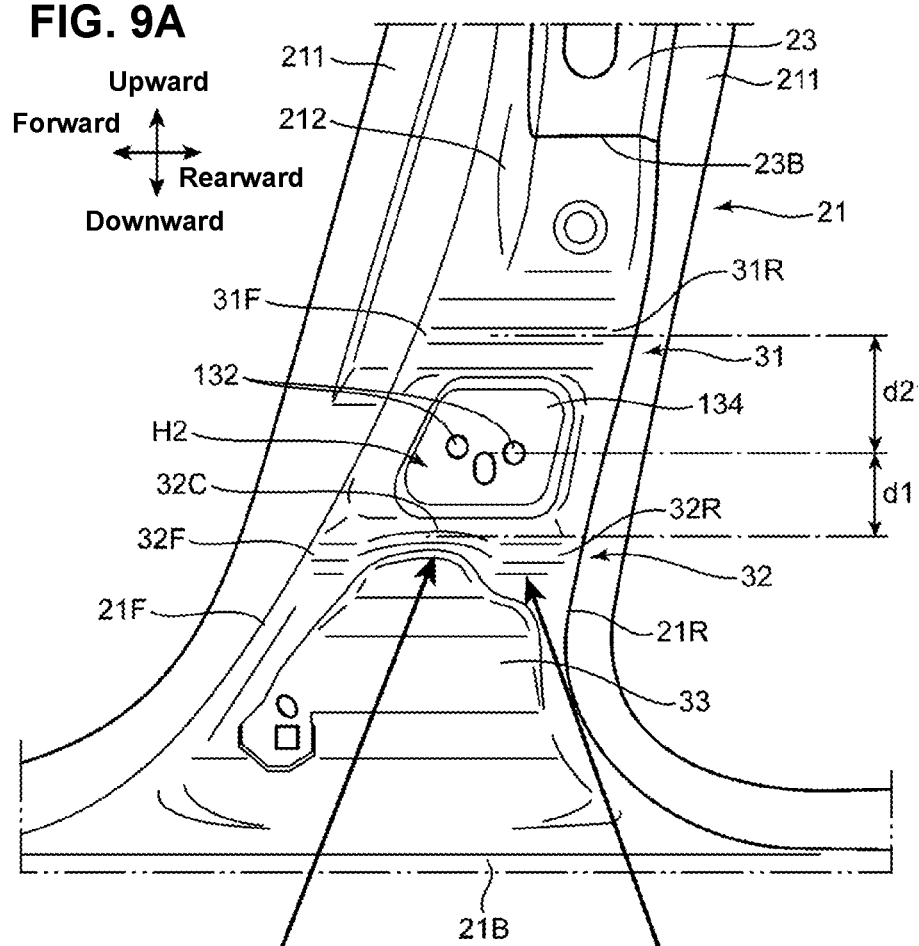
FIG. 9A is an enlarged view of a major part (a lower part of the center pillar) of FIG. 3, FIGS. 9B and 9C are schematic sectional views of portions respectively shown by arrows.
Figure 9B:
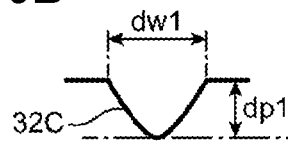
Figure 9C:
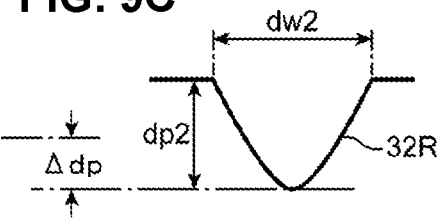
Figure 10:
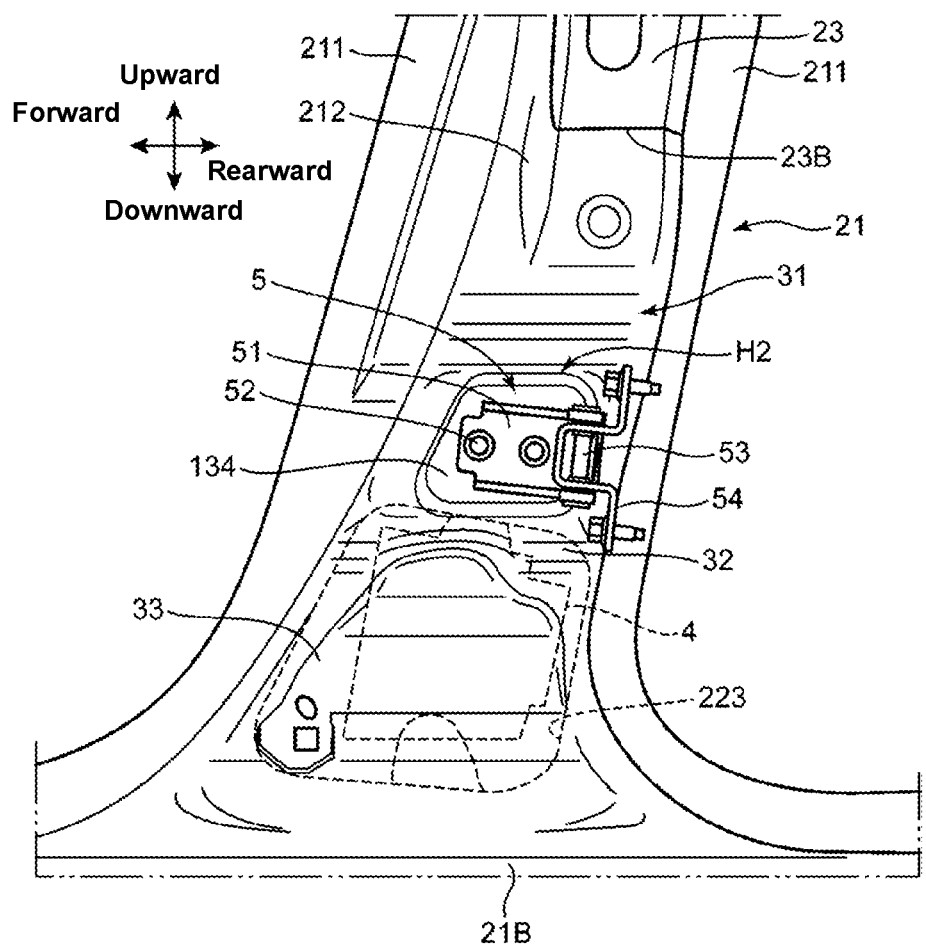
FIG. 10 is a view of the major part shown in FIG. 9A, in which respective positions of an opening portion of an inner panel and a seatbelt retractor are additionally shown.

Subsequently, the first recessed bead 31 and the second recessed bead 23 as the fragile sections provided at the reinforcement will be described specifically. The first-and-second recessed beads 31, 32 are provided to promote the bending of the center pillar 13 at the intended position in order to suppress the center pillar 13 from being deformed into the cabin in the vehicle side collision. FIG. 6 is a perspective view of the outward side, in the vehicle width direction, of the center pillar 13, FIG. 7 is a sectional view taken along line VII-VII of FIG. 3, and FIG. 8 is a sectional view taken along line VIII-VIII of FIG. 3. FIG. 9A is an enlarged side view of around the lower part of the center pillar 13, and FIGS. 9B and 9C are schematic sectional views of portions respectively shown by arrows. FIG. 10 is a view of the part shown in FIG. 9A, in which respective positions of the opening portion 223 of the inner panel 22 and the seatbelt retractor 4 are additionally shown.

The first-and-second recessed beads 31, 32 are recessed grooves extending in the longitudinal direction (horizontal direction). Specifically, the first-and-second recessed beads 31, 32 are the sections which are made by deforming the protrusion portion 212 of the reinforcement 21 so as to be curved in a recessed groove from the outward side to the inward side in the vehicle width direction, and configured to extend in the horizontal direction from the front ridgeline portion 21F (one-end side in the vehicle longitudinal direction) to the rear ridgeline portion 21R (the other-end side), respectively. That is, respective front edges 31F, 32F of the first-and-second recessed beads 31, 32 reach the front-side rising portion 213, and respective rear edges 31R, 32R of the first-and-second recessed beads 31, 32 reach the rear-side rising portion 213.

That is, the first-and-second recessed beads 31, 32 extend over an entire width, in the longitudinal direction, of the reinforcement 21 except the flange portions 211. Thereby, when the side-collision load is applied, the first-and-second recessed beads 31, 32 are relatively easily bent and deformed, so that bending lines can be positively formed at the reinforcement 21 which is bent in the vehicle width direction. Accordingly, by forming the first-and-second recessed beads 31, 32 at respective desired positions of the reinforcement 21, the first-and-second recessed beads 31, 32 can be bent inwardly in the vehicle width direction in the vehicle side collision such that a section of the reinforcement 21 which is located at the higher level than the first recessed bead 31 takes a linear-and-vertical position.

The lower hinge attachment section H2 is formed at a protrusion section 134 which protrudes at the protrusion portion 212 in an area interposed between the first-and-second recessed beads 31, 32. The protrusion section 134 has nearly a trapezoid or diamond shape and comprises a flat top face. Two screw holes 132 are formed at this top face, where the rear-door hinge 5 is attached.

Referring to FIGS. 6, 8 and 10, the rear door hinge 5, which is an assembly parts to hinge-connect the rear door (not illustrated) to the center pillar 13, comprises an elbow fitting 51, fixing screws 52, a hinge axis (shaft) 53, and an attachment fitting 54. The elbow fitting 51, which is a plate member which is configured to bend at a right angle, comprises a one-end side which is face-contacted to the protrusion section 134 and the other-end side which holds the hinge axis 53. The fixing screws 52 are fastened to the screw holes 132 so that the one-end side of the elbow fitting 51 is fixedly screwed to the protrusion section 134. The hinge axis 53 is a rotational axis of the rear door. The attachment fitting 54, which is a fitting to be fixed to a specified point of the rear door, is assembled so as to rotate around the hinge axis 53. The side-collision load which the rear door receives is inputted to the lower hinge attachment section H2 through the lower rear-door impact bar 16 (FIG. 2) and the rear-door hinge 5.

FIG. 7 shows not only the closed cross section C of the center pillar 13 but closed cross sections C1, C2 of the side sill 12. The side sill 12 is formed by joining a side sill inner 121 and a side sill outer 122 which are respectively configured to have a hat-shaped cross section and to face each other. The lower end portion 22B of the inner panel 22 is interposed between respective joint faces of the side sill inner 121 and the side sill outer 122. A closed cross section of the side sill 12 is partitioned into the two closed cross sections C1, C2. Inside these closed cross sections C1, C2 are respectively arranged first-and-second bulkheads 123, 124 for sectional collapse prevention.

The first-and-second recessed beads 31, 32 are provided in order that these beads 31, 32 become the bending causing point of the center pillar 13 in the vehicle side collision so that the linearity of the upper part of the center pillar 13 (the section which is reinforced by the patch 23) can be maintained. Further, the present embodiment is configured such that the second recessed bead 32 located at the lower level than the lower hinge attachment section H2 is bent before the first recessed bead 31 in the vehicle side collision.

As a method of making the bending of the second recessed bead 32 precede the bending of the first recessed bead 31 (hereafter, referred to as "preceding bending"), various ways can be exemplified. For example, the preceding bending of the second recessed bead 32 can be attained by setting the rigidity (strength) of the second recessed bead 32 to be lower than that of the first recessed bead 31. The way of differentiating the rigidity includes various manners, such as differentiating the shape of the bead (recessed groove), differentiating the plate thickness, or differentiating the kind of material by using a forming technology of the tailored blank or the like between the both beads 31, 32, or additionally forming a slit or the like at the second recessed bead 32 only. Further, the preceding bending of the second recessed bead 32 can be attained by positioning the second recessed bead 32 more closely to an input point of the side-collision load compared to the first recessed bead 31. This is because the fragile section which is closer to the load input point receives damage more initially.

The first recessed bead 31 is the recessed groove which extends linearly in the vehicle longitudinal direction (horizontal direction) as apparent from FIGS. 6 and 9A, 9B. Further, the bead width and the bead depth of the first recessed bead 31 are roughly constant in the longitudinal direction. A cross section of a central part 31C of the first recessed bead 31 is shown in FIG. 7, and a cross section of the rear edge 31R (which is the same as a cross section of the front edge 31F) is shown in FIG. 8. As apparent from FIGS. 7 and 8, the first recessed bead 31 is configured in a mortar-like shape to have a flat-plate shaped valley part and a slant part rising relatively gently from both edges of the valley part in a vertical cross section of any position, in the longitudinal direction, thereof.

Meanwhile, the second recessed bead 32 is configured to extend in the horizontal direction, but it is configured such that a central part 32C, in the vehicle longitudinal direction, thereof is curved upwardly compared to the front edge 32F (one-end side) and the rear edge 32R (the other-end side). Further, the bead depth of the second recessed bead 32 is set such that respective bead depths of the front edge 32F and the rear edge 32R are deeper than the bead depth of the central part 32C. According to this difference of the bead depth, respective bead widths of the front edge 32F and the rear edge 32R are wider than the bead width of the central part 32C.

This difference of the bead depth is shown in the sectional views of FIGS. 7 and 8. FIG. 7 shows a cross section of the central part 32C of the second recessed bead 32 and an inner face of the front ridgeline portion 21F which is formed at the front edge 32F. FIG. 8 shows a cross section of the rear edge 32R and the central part 32C. It is apparent from these figures that the bead depths of the front edge 32F and the rear edge 32R are deeper than that of the central part 32C. It is also apparent that the bead widths of the front edge 32F and the rear edge 32R are wider than that of the central part 32C. These matters are schematically shown in FIGS. 9B and 9C as well. The bead depth dp1 of the central part 32C is set to be shallower than the bead depth dp2 of the rear edge 32R by Δdp. In the present embodiment, the bead depth dp1 is nearly ½ of the bead depth dp2. Further, the bead width dw1 of the central part 32C is narrower than the bead width dw2 of the rear edge 32R.

Further, it is apparent from FIGS. 7 through 9A that the level (height position) of the deepest bead portion of the central part 32C is higher than those of the deepest bead portions of the front edge 32F and the rear edge 32R, and the central part 32C is curved upwardly. Accordingly, an upper edge portion of the housing 33 is configured to have an upwardly-convex curved shape. This curved shape is superior in securing an arrangement space of the seatbelt retractor 4 inside the center pillar 13.

The sectional shape of the second recessed bead 32 is similar to a U or V shape. That is, the second recessed bead 32 has a curved bottom portion, not a flat bottom portion like the mortar-like first recessed bead 31. Therefore, the bead widths of the central part 32C, the front edge 32F, and the rear edge 32F of the second recessed bead 32 are narrower than those of the first recessed bead 31.

Referring to FIGS. 9A and 9B, the second recessed bead 32 is arranged more closely to the lower hinge attachment section H2 than the first recessed bead 31 for the preceding bending of the second recessed bead 32 according to the present embodiment. In the lower hinge attachment section H2, the input point of the side-collision load is positioned at the screw holes 132 where the fixing screws 52 of the rear door hinge 5 are fastened. A distance d1 between the above-described input point and the central part 32C of the second recessed bead 32 is set to be shorter than a distance d2 between the above-described input point and the first recessed bead 31 (d1<d2). Even in a case where the input portion of the side-collision load is the top face of the protrusion portion 134, the bottom portion of the second recessed bead 32 is downwardly adjacent to the protrusion portion 134 and thereby exists more closely than the bottom portion of the first recessed bead 31. Thus, since the second recessed bead 32 is formed at the position which is closer to the input point of the side-collision load, compared to the first recessed bead 31, and also the shape of the bead cross section is the U or V shape having the relatively narrow width, the preceding bending of the second recessed bead 32 is attained so that the second recessed bead 32 can be bent before the first recessed bead 31 in the vehicle side collision.

Moreover, as shown in FIG. 10, the opening portion 223 for installing the seatbelt retractor 4 is provided at the position of the inner panel 22 which faces the second recessed bead 32. This opening portion 223 serves as a low-strength section of the inner panel 22, thereby increasing the fragility around the second recessed bead 32 of the center pillar 13. This contributes to further promoting the preceding bending of the second recessed bead 32 in the vehicle side collision.

[Moves of Center Pillar in Vehicle Side Collision]

Figure 11A:
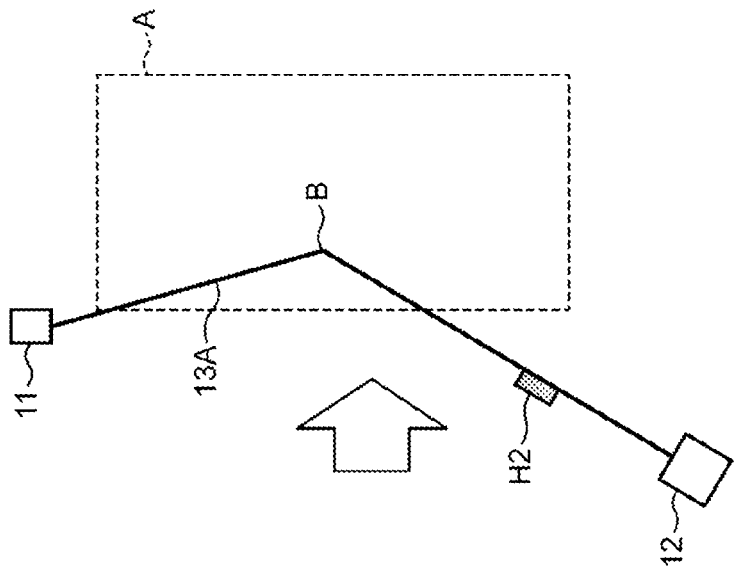
FIGS. 11A and 11B are schematic diagrams showing moves of a center pillar in a vehicle side collision according to a first comparative example.
Figure 11B:
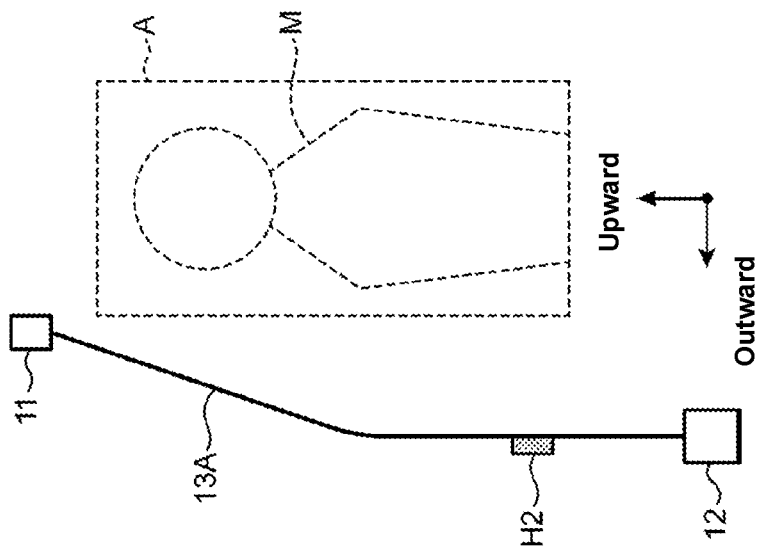

First, comparative examples will be described referring to FIGS. 11A, 11B and FIGS. 12A, 12B, 12C. FIGS. 11A, 11B are schematic diagrams showing moves of a center pillar 13A in the vehicle side collision according to a first comparative example. These figures show respective schematic sections, in the vehicle width direction, of the vehicle, which schematically show the roof rail 11, the side sill 12, the center pillar 13A which extends in the vertical direction between these 11, 12, and an occupying (existing) area A of an occupant M seated in a seat in the cabin. The first comparative example shows a case where no fragile section for bending promotion is provided at the center pillar 13A. In other words, this is the case where the rigidity of the center pillar 13A is nearly constant in the vertical direction.

FIG. 11A shows a state where the side-collision load is not applied to the center pillar 13A, and FIG. 11B shows a state after the side-collision load is applied.

In the case where there is no fragile section for bending promotion, a position which is far away from connection points of the center pillar 13A to the other members, i.e., the roof rail 11 and the side sill 12, becomes a weak (fragile) point. That is, a central position, in the vertical direction, of the center pillar 13A becomes the weak (fragile) point. Accordingly, when the side-collision load is applied to the center pillar 13A, as shown in FIG. 11B, a bending point B is easily formed at the above-described central position of the center pillar 13B, so that the possibility that the center pillar 13A is bent (deformed) so as to come into the above-described occupying area A becomes high. Particularly, in a case where the harness hole 133 (FIG. 3) is formed at the center pillar 13A, this possibility becomes higher.

FIGS. 12A-12C are schematic diagrams showing moves of a center pillar 13B in the vehicle side collision according to a second comparative example. A single fragile section W is provided at the center pillar 13B at a position which is located closely to and at a higher level than the lower hinge attachment section H2. FIG. 12A shows a state where the side-collision load is not applied to the center pillar 13B, and FIGS. 12B, 12C show two supposed states after the application of the side-collision load to the center pillar 13B.

When the side-collision load is applied through the lower hinge attachment section H2, a bending point B1 is formed at the fragile section W of the center pillar 13B. In this case, since the position of the fragile section W is located at the higher level than the lower hinge attachment section H2, the lower bending point B1 may be bent toward a lower end side of the above-described occupying area A, so that a part of the center pillar 13B may come into the occupying area A as shown in FIG. 12B. Alternatively, as shown in FIG. 12C, bending of the bending point B1 may not occur sufficiently (all of the side-collision load may not be received), so that another bending point B2 may be formed at the central position, in the vertical direction, of the center pillar 13B. This bending point B2 may be possibly formed at a surrounding area of the harness hole 133, for example. A part of the center pillar 13B may come into the occupying area A because of existence of the bending point B2.

Figure 13C:
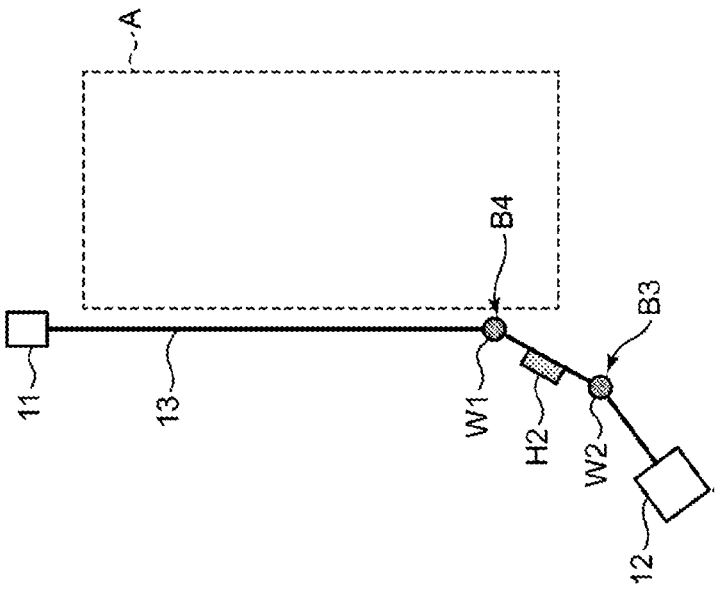
FIGS. 13A-13C are schematic diagrams showing moves of the center pillar in the vehicle side collision according to the present embodiment.
Figure 13B:
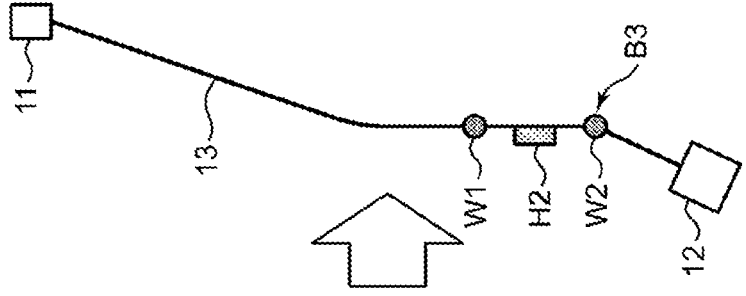
Figure 13A:
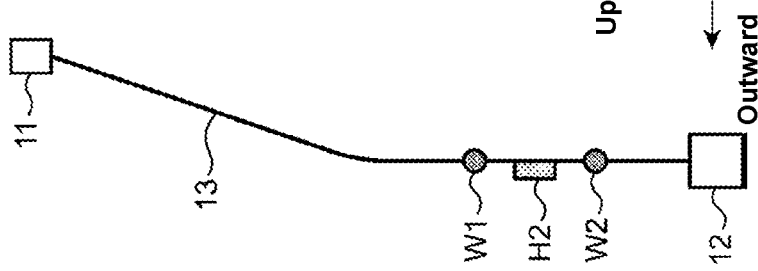

FIGS. 13A-13C are schematic diagrams showing moves of the center pillar 13 in the vehicle side collision according to the present embodiment. The center pillar 13 of the present embodiment comprises a first fragile section W1 (the first recessed bead 31) which is provided at the upper level than the lower hinge attachment section H2 and a second fragile section W2 (the second recessed bead 32) which is provided at the lower level than the lower hinge attachment section H2 as shown in FIG. 13A. Herein, the second fragile section W2 is configured to be bent before the first fragile section W1 in the vehicle width direction.

When the side-collision load is applied through the lower hinge attachment section H2, a bending point B3 is formed at the second fragile section W2 of the center pillar 13B first. If the first fragile section W1 is configured to be bent before the second fragile section W1 in the vehicle width direction instead, the second fragile section W2 positioned closely to the connection portion to the side sill 12 may become stronger than the central part, in the vertical direction, of the center pillar 13, which may cause the above-described moves shown in FIGS. 12B and 12C, therefore may not preferable.

Then, a bending point B4 is formed at the first fragile section W1 of the center pillar 13 as shown in FIG. 13C. Herein, since the bending casing point is the bending point B3, which is located at the lower level than that of the above-described second comparative example and also the side-collision load is received by the two bending points B3, B4, the linearity of the upper part of the center pillar 13 can be easily maintained. In particular, the patch 23 is provided at the outside face of the upper part of the reinforcement 21 in the present embodiment. Therefore, the cross-sectional secondary moment of the center pillar 13 at this portion is increased. That is, the rigidity difference between the portion where the first-and-second fragile sections W1, W2 are provided and the portion where the patch 23 is provided is properly increased, so that the structure having the above-described properly-maintained linearity is provided. Accordingly, the present embodiment can provide an ideal state in the vehicle side collision, in which the lower part of the center pillar 13 where the first-and-second fragile sections W1, W2 are provided is bent but the upper part of the center pillar 13 maintains its linearity. Thus, the center pillar 13 can be prevented in advance from coming into the above-described occupying area A.

[Effects]

The side vehicle-body structure of the present embodiment described above performs the following effects. In the side frame 10 of the present embodiment, the first recessed bead 31 (first fragile section) and the second recessed bead 32 (second fragile section) are respectively provided at the higher level and the lower level than the lower hinge attachment section H2 of the reinforcement 21 which becomes the input point of the side-collision load in the vehicle side collision. Accordingly, the fragility of the portion around the lower hinge attachment section H2 can be properly enhanced, compared to the upper part of the reinforcement 21 which faces the cabin space for the occupant (passenger), so that this portion can be securely the bending causing point in the vehicle side collision. Further, since the center pillar 13 is bent at the two points of the first-and-second recessed beads 31, 32, the sufficient amount of bending can be obtained when receiving the side-collision load, so that bending of the other section of the reinforcement 21 can be prevented. Moreover, the second recessed bead 32 located at the lower level than the lower hinge attachment section H2 is bent in advance and then the first recessed bead 31 located at the upper level than the lower hinge attachment section H2 is bent. Accordingly, the bending causing point is positioned at the properly lower level, so that the possibility of interference of the center pillar 13 with the occupant can be properly reduced.

The first-and-second recessed beads 31, 32 are the embodiments which respectively extend in the horizontal direction from the one-end side, in the vehicle longitudinal direction, of the reinforcement 21 to the other-end side.

Accordingly, the beads 31, 32 can be made to become the bending lines in the vehicle side collision such that the section of the reinforcement 21 which is located at the higher level than the first recessed bead 31 takes the linear-and-vertical position.

Further, the inner panel 22 includes the opening portion 223 for assembling the seatbelt retractor 4 at the area facing the preceding-bending second recessed bead 32. Thereby, the fragility of the portion of the center pillar 13 around the second recessed bead 32 can be further enhanced by the opening portion 223, in addition to securing the assembling of the seatbelt retractor 4 inside the center pillar 13. Accordingly, the preceding bending of the second recessed bead 32 can be securely attained.

The bead depths of the front edge 32F and the rear edge 32R of the second recessed bead 32 are set to be deeper than the bead depth of the central part 32C. Accordingly, since the bead depth of the central part 32 is shallow compared to the bead depths of the front edge 32F and the rear edge 32R, the storage space for the seatbelt retractor 4 can be easily formed inside the center pillar 13, thereby improving the storability of the seatbelt retractor 4. Further, since the bead depth of the second recessed bead 32 is set such that the front edge 32F and the rear edge 32R are relatively deep, the bending properties of the front edge 32F and the rear edge 32R can be made appropriate. Accordingly, the reinforcement 21 can be easily bent along the second recessed bead 32 as intended.

Moreover, the central part 32C of the second recessed bead 32 is configured to be curved upwardly compared to the front edge 32F and the rear edge 32R. Accordingly, the arrangement space of the seatbelt retractor 4 can be secured more properly by the upwardly-curved configuration of the above-described central part 32C. Further, it can be prevented by this curved shape of the second recessed bead 32 that the side-collision load is concentrated on a certain single point of the second recessed bead 32, so that the load is applied over a whole length of the second recessed bead 32, thereby providing easily bending.

Description of Modified Embodiments

The present invention is not limited to the above-described embodiment, but any other modified embodiments may be applied.

(1) The above-described embodiment exemplified the first-and-second recessed beads 31, 32 as the examples of the first-and-second fragile sections. The fragile section is not limited to the bead, but at least one of the first-and-second fragile sections may be configured by forming a slit at the reinforcement 21, making the plate thickness thinner, making the material of the plate member of a low-strength material partially, or the like, for example.

(2) The above-described embodiment exemplified the second recessed bead 32 in which the central part 32C has the shallower bead depth than the front edge 32F and the rear edge 32R and is of the upwardly-convex curved shape. However, the present invention is not limited to this. The second recessed bead 32 may be configured such that its bead depth is constant in the longitudinal direction and it extends linearly in the longitudinal direction.

(3) The above-described embodiment exemplified the patch 23 which is provided at the outside face of the upper part of the reinforcement 21. However, the patch 23 may be provided at an inside face of the reinforcement 21 instead. Further, the patch 23 may be formed in any manner as long as it is able to reinforce the upper part of the reinforcement 21. Additionally, if the strength of the upper part of the reinforcement 21 is secured by the reinforcement 21 itself, the patch 23 may be omitted.

What is claimed is:

1. A side vehicle-body structure of a vehicle, comprising:
a center pillar including a reinforcement provided on an outward side, in a vehicle width direction, of a vehicle body and an inner panel provided on an inward side, in the vehicle width direction, of the vehicle body,
wherein the reinforcement of said center pillar comprises upper-and-lower hinge attachment sections for attaching hinges of a rear door and first-and-second fragile sections for promoting bending of the center pillar in a vehicle side collision, said upper-and-lower hinge attachment sections are provided to be spaced apart from each other in a vertical direction, said first fragile section is provided at a higher level than said lower hinge attachment section, and said second fragile section is provided at a lower level than said lower hinge attachment section and configured to be bent before said first fragile section in the vehicle side collision,
said first-and-second fragile sections are first-and-second recessed beads which respectively extend in a horizontal direction from a one-end side, in a vehicle longitudinal direction, of said reinforcement to the other-end side,
the side vehicle-body structure of the vehicle further comprises a seatbelt retractor which is provided inside said center pillar at a lower level than said lower hinge attachment section, wherein the inner panel of said center pillar includes an opening portion for assembling the seatbelt retractor at an area facing said second recessed bead, and
a bead depth of said second recessed bead is set such that respective bead depths of a one-end side, in the vehicle longitudinal direction, of the second recessed bead and the other-end side, in the vehicle longitudinal direction, of the second recessed bead are deeper than the bead depth of a central part, in the vehicle longitudinal direction, of the second recessed bead.

2. The side vehicle-body structure of the vehicle of claim 1, wherein a distance between said second fragile section and said lower hinge attachment section is set to be shorter than that between said first fragile section and said lower hinge attachment section.

3. The side vehicle-body structure of the vehicle of claim 1, wherein the inner panel of said center pillar includes a low-strength section at an area facing said second fragile section.

4. The side vehicle-body structure of the vehicle of claim 1, wherein said central part, in the vehicle longitudinal direction, of the second recessed bead is configured to be curved upwardly compared to said one-end side and said other-end side of the second recessed bead.

5. The side vehicle-body structure of the vehicle of claim 1, further comprising a reinforcing plate which is provided at an outside face of said reinforcement at a position located at a higher level than said first fragile section.

6. A side vehicle-body structure of a vehicle, comprising:
a center pillar including a reinforcement provided on an outward side, in a vehicle width direction, of a vehicle body and an inner panel provided on an inward side, in the vehicle width direction, of the vehicle body,
wherein the reinforcement of said center pillar comprises upper-and-lower hinge attachment sections for attaching hinges of a rear door and first-and-second fragile sections for promoting bending of the center pillar in a vehicle side collision, said upper-and-lower hinge attachment sections are provided to be spaced apart from each other in a vertical direction, said first fragile section is provided at a higher level than said lower hinge attachment section, and said second fragile section is provided at a lower level than said lower hinge attachment section and configured to be bent before said first fragile section in the vehicle side collision, said first-and-second fragile sections are first-and-second recessed beads which respectively extend in a horizontal direction from a one-end side, in a vehicle longitudinal direction, of said reinforcement to the other-end side, the side vehicle-body structure of the vehicle further comprises a seatbelt retractor which is provided inside said center pillar at a lower level than said lower hinge attachment section, wherein the inner panel of said center pillar includes an opening portion for assembling the seatbelt retractor at an area facing said second recessed bead, and said central part, in the vehicle longitudinal direction, of the second recessed bead is configured to be curved upwardly compared to said one-end side and said other-end side of the second recessed bead.

7. The side vehicle-body structure of the vehicle of claim 6, wherein a distance between said second fragile section and said lower hinge attachment section is set to be shorter than that between said first fragile section and said lower hinge attachment section.

8. The side vehicle-body structure of the vehicle of claim 6, wherein the inner panel of said center pillar includes a low-strength section at an area facing said second fragile section.

* * * * *